(12) United States Patent
Wei et al.

(10) Patent No.: US 10,265,848 B2
(45) Date of Patent: Apr. 23, 2019

(54) ROBOTIC HYBRID SYSTEM APPLICATION FRAMEWORK BASED ON MULTI-CORE PROCESSOR ARCHITECTURE

(71) Applicants: Hongxing Wei, Beijing (CN); Ying Zou, Beijing (CN); Youdong Chen, Beijing (CN); Miao Liu, Beijing (CN); Zhen Huang, Beijing (CN)

(72) Inventors: Hongxing Wei, Beijing (CN); Ying Zou, Beijing (CN); Youdong Chen, Beijing (CN); Miao Liu, Beijing (CN); Zhen Huang, Beijing (CN)

(73) Assignee: Beihang University, Beijing (CN)

( * ) Notice: Subject to any disclaimer, the term of this patent is extended or adjusted under 35 U.S.C. 154(b) by 167 days.

(21) Appl. No.: 15/324,723

(22) PCT Filed: Jul. 8, 2014

(86) PCT No.: PCT/CN2014/081856
§ 371 (c)(1),
(2) Date: Jan. 8, 2017

(87) PCT Pub. No.: WO2016/004587
PCT Pub. Date: Jan. 14, 2016

(65) Prior Publication Data
US 2017/0203436 A1    Jul. 20, 2017

(51) Int. Cl.
*B25J 9/16*      (2006.01)
*G06F 9/54*     (2006.01)
(Continued)

(52) U.S. Cl.
CPC .......... *B25J 9/161* (2013.01); *G06F 9/4887* (2013.01); *G06F 9/54* (2013.01); *G06F 15/80* (2013.01);
(Continued)

(58) Field of Classification Search
CPC .......... B25J 9/161; G06F 9/4887; G06F 9/54; G06F 15/80; G05B 2219/33216; G05B 2219/34258
See application file for complete search history.

(56) References Cited

U.S. PATENT DOCUMENTS

| 2006/0184272 A1* | 8/2006 | Okazaki | B25J 9/1697 |
| | | | 700/245 |
| 2014/0074291 A1* | 3/2014 | Emoto | B25J 9/1664 |
| | | | 700/258 |

FOREIGN PATENT DOCUMENTS

| CN | 101324852 A | 12/2008 |
| CN | 101894045 A | 11/2010 |

OTHER PUBLICATIONS

Hongxing Wei et al, RGMP-ROS: A Real-Time ROS Architectecure of Hybrid RTOS and GPOS on Multi-Core Processor, IEEE International Conference of Robotics & Automation, Jun. 7, 2014, pp. 2484-2486, Figs. 3-5, 9, IEEE, Hong Kong, China.
(Continued)

Primary Examiner — Jacob D Dascomb
(74) Attorney, Agent, or Firm — Mark Clodfelter

(57) ABSTRACT

The present invention relates to a robot hybrid system application framework based on a multi-core processor architecture. In the robot system with ARM/X86 multi-core processor as the controller, multi-core parallel processing architecture of the ARM/X86 multi-core processor is used to run the robotic hybrid system application framework comprising real-time operating system, non-real-time operating system and system supporting frame in the whole robot controller, so as to provide improved operating system services. In this application framework, a real-time operating system runs independently in one ARM/X86 core, while several non-real-time operating systems run on other ARM/X86 cores. The operating systems occupy processor
(Continued)

resources and peripherals separately and run robotic applications with different real-time requirements. The application program can be used as a unified robot operating system (ROS) application node.

8 Claims, 2 Drawing Sheets

(51) Int. Cl.
    *G06F 15/80*     (2006.01)
    *G06F 9/48*     (2006.01)

(52) U.S. Cl.
    CPC .............. *G05B 2219/33216* (2013.01); *G05B 2219/34258* (2013.01)

(56) References Cited

OTHER PUBLICATIONS

Qiang Yu et al, A Novel Multi-OS Architecture for Robot Application, Proceedings of the 2011 IEEE International Conference on Robotics and Biomimetics, Dec. 7-11, 2011, pp. 2302-2306, IEEE, Phuket, Thailand.

\* cited by examiner

ROBOTIC HYBRID SYSTEM APPLICATION FRAMEWORK BASED ON MULTI-CORE PROCESSOR ARCHITECTURE

CROSS REFERENCE TO RELATED APPLICATIONS

This application is a 35 USC 371 national stage entry from Applicants PCT application no. PCT/CN2014/081856, filed Jul. 8, 2014, and published as application no. WO/2016/004587 on Jan. 14, 2016.

FIELD OF THE INVENTION

The present invention generally belongs to the field of robots and robotic controls, and more specifically to a robotic hybrid system application framework based on multi-core processor architecture.

BACKGROUND OF THE INVENTION

Robot control is an important field of robot research, and demands to its applications are becoming increasingly diversified and accompanied by use of various real-time and non real-time operating systems to provide system support. Programmers have to use the rich programming resources provided by the operating systems to compose robot control programs, while they also need real-time support provided by the operating systems. Robotic Operating System (ROS) based on Linux is an open-source operating system created for raising the efficiency of robot development. But the non real-time characteristics of Linux limit application of Robotic Operating System (ROS) on robotic real-time control. On the other hand, there are numerous real-time operating systems on the market, most of which, in comparison with general operating systems, are single functional and lack system application resources; thus, it is difficult for them to easily realize complex applications.

SUMMARY OF THE INVENTION

To overcome the existing technical problems, the present invention provides a hybrid robotic system application framework based on multi-core processor architecture. Said architecture can be applied in various robotic controllers based on ARM/X86 multi-core architecture, can greatly improve development efficiency of robotic control software while satisfying real-time requirement, and can reduce the cost of Integrated development.

The application framework mainly comprises three parts: Robotic Operating System (ROS), real-time operating system, hybrid operating system supporting framework (RGMP, RTOS and GPOS on Multi-Processor), where:
  Robotic Operating System (ROS) (including non real-time operating system, typically Linux, for supporting Robotic Operating System), for supporting basic robotic applications, corresponding services and system resources;
  real-time operating system, for providing system resources and services of robot real-time tasks;
  hybrid operating system supporting framework (RGMP) for supporting operation and coordination of Robotic Operating System and real-time operating system.
  RGMP is an open-source supporting frame that supports parallel operation of real-time operating system and non real-time operating system on multi-core processor; it uses interrupt router in SMP (symmetric multi-core architecture) computer to independently allocate interrupt resources of real-time operating system and non real-time operating system, and is naturally capable of running these operating systems in parallel and separately on individual processor cores, reasonably allocating process resources, reducing system coupling, and avoiding resource competition and switch problem brought about by conventional shared hybrid operating system due to coexistence at one process core. Open source codes of RGMP are seen at:
http://rgmp.sourceforge.net/wiki/index.php/Main Page
Hybrid operating system supporting frame RGMP includes the following four system layout content sections:
  users realize fast development of real-time robot control programs by real-time application framework RTroscpp (optional);
  non real-time system and real-time system individually and separately occupy different CPU cores of a multi-core processor, they can simultaneously maintain their respective application status without the need to optimize with respect to hybrid operating system framework, and their operations and debugging are independent with respect to each other
  during operations of the hybrid system, real-time and non real-time operating systems independently occupy their respective hardware resources;
  dispatches of shared devices are realized through communications among them.
In the present invention, inter-node communication protocol with ROS provided by robot operating system is used between real-time system and non real-time system, and upper communication interface based on shared memory is provided between the two systems by RGMP, including:
  standard TCP/IP protocol stack between real-time and non real-time systems;
  real time system debugging information printing pipeline; and
  three user-defined interfaces.
Several features of the application framework of the present invention include:
  Real-time and non real-time systems are using the computer's memory in different memory addresses.
  Interrupts of inter-system external devices are independent of each other, without any sharing, and interrupts are independently assigned by interrupt router provided in ARM/X86 multi-core.
  Real-time systems and non-real-time systems all use the standard ROS programming and communications interfaces; in the whole robot system application and control procedures are running as standard ROS nodes and can be under unified management by ROS; communication between nodes are performed by ROS standard communication interface.
  The user can run on the real-time system the node program originally running on ROS being independent of third-party library. Robot applications written by user with ROS robot operating system can run on a real-time or non-real-time device.
  Users can take advantage of application resources provided by ROS and of the valid extension of the present invention for ROS applications.
  In the present invention, highly complex functional nodes with relatively low real-time requirements run on server equipped with ROS standard robot operating system via Ethernet. Application running on non-real-time system and robot control program running on real-time system perform information exchange using the standard communication interface provided by ROS.

When using the present invention, an application in the non-real-time operating system section can directly use ROS own software resources, to carry out tasks such as human-computer interaction, speech recognition, 3D modeling, map navigation and so on, and can independently perform programming; in real time part of the system it can write real-time applications, connect the motor drive by using the real-time bus (such as CAN (controller Area Network), EtherCAT bus of Times of Fu company, etc.), perform complex motor motion control and other tasks of high real-time requirements.

According to one aspect of the invention, there is provided a robot hybrid system of multi-core processor architecture, comprising a robot operating system further comprising a non-real-time operating system for supporting the robot operating system, for providing basic robotic applications and corresponding service and system resources. A real-time operating system is provided for providing service and system resources of robot real-time tasks. A hybrid operating system supports frame (RGMP), for supporting operation and coordination of robot operating system and real-time operating system, to run real-time operating system and non-real-time operating system simultaneously on a multi-core processor platform.

According to a further aspect, in the robot hybrid system, the non-real-time operating system with real-time operating system occupy separate memory space, and the multi-core processor platform is a control panel, a controller and/or an industrial PC based on ARM/X86 architecture multi-core processor, the non-real-time operating system can be Linux, and the real-time operating system can be Yuqix.

DETAILED DESCRIPTION OF THE EMBODIMENTS

Details of the technical solution of the present invention will be described below in connection with the accompanying drawings. It should be noted that the described examples are merely intended to facilitate understanding of the invention, but are not intended to be limiting.

While the description of embodiments of the present invention are mainly made in connection with Linux non real-time operating system and Yuqix real-time operating system, non-real time operating system and real-time operating system which can use the present invention are not limited to Linux non-real-time operating system and Yuqix real-time operating system; rather, they can be any other non-real-time operating system and/or real-time operating system.

Figure 1:
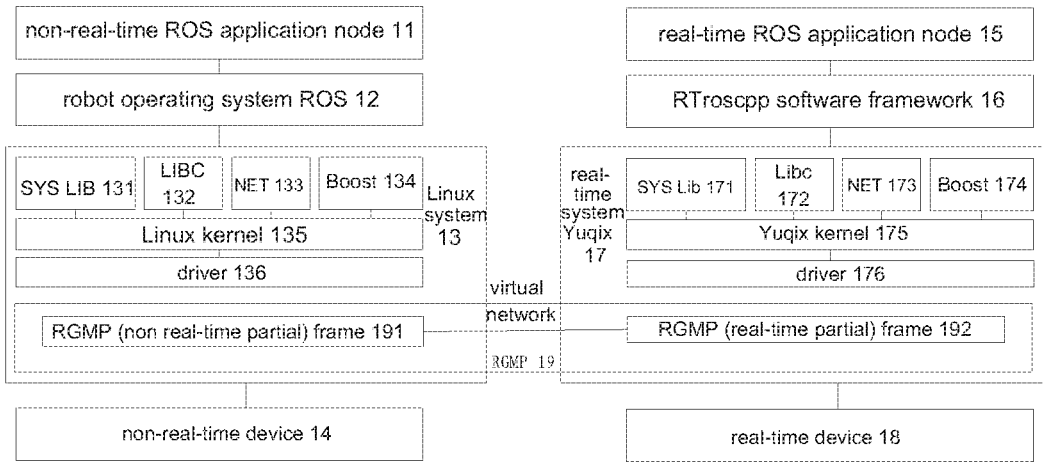
FIG. 1 is a block diagram of the overall structure of an embodiment of the invention.

FIG. 1 shows the overall structure of the application framework of a robot hybrid system of the present invention based on multi-core processor architecture, which application framework, by hybrid operating system support framework RGMP 19, runs Linux system 13 and Yuqix real-time systems 17 simultaneously on a multi-core processor platform, which is based on ARM architecture and includes non-real-time device 14 and real-time device 18; Linux systems 13 and Yuqix real-time system 17 occupy separate memory spaces.

Linux system 13 is an embedded system, including, basic to operating system, system library SYS LIB 131, C language library LIBC 132, network protocol NET 133, BOOST library 134, Linux kernel 135 and driver 136 and other necessary modules, and runs on RGMP (non real-time partial) frame 191; the robot operating system ROS 12 runs on the top in the Linux system 13. Non-real-time ROS applications node 11 programmed using ROS standard interfaces and ROS tools runs on ROS 12.

On the other hand, Yuqix real-time operating system 17 provides a large number of POSIX-compliant system call interfaces, it also contains necessary modules including system library SYS LIB 171, C language library LIBC 172, network protocol NET 173, BOOST library 174, Yuqix kernel 175 and drivers 176 and so on, which are basic to the operating system. On top of real-time systems Yuqix 17, the user can directly write real-time ROS applications node 15, use standard ROS function interfaces to write ROS real-time node 15 depending on RTroscpp software frame 16, or run ROS program node 11, originally running on non-real-time system, on Yuqix. Yuqix runs on RGMP (real-time partial) frame 192.

Communication between the two operating systems 17 and 13 is carried out via VNET virtual network mechanism of RGMP 19.

Figure 2:
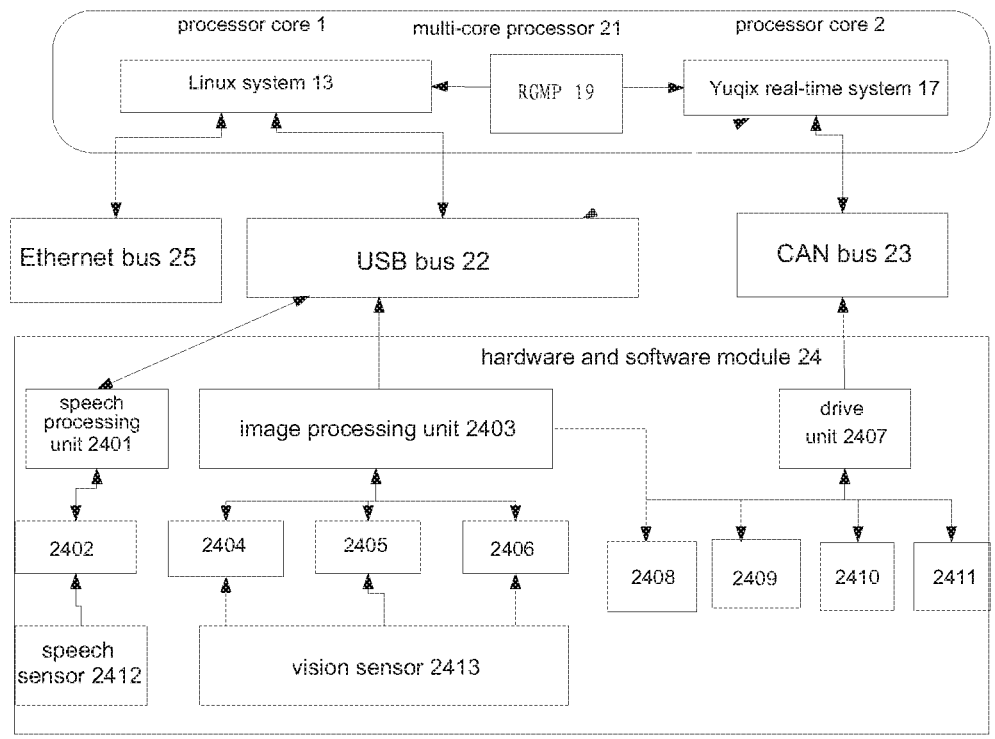
FIG. 2 shows the connection of a typical example of control application of the present invention.

FIG. 2 shows the connection of a typical control application example of robot hybrid system application framework in accordance with the present invention. In the example of FIG. 2, the robot controller based on multi-core processors 21 runs the application framework of the robot hybrid operating system of the present invention, the non-real-time system Linux 13 and real-time system Yuqix 17 respectively use RGMP 19 to run on different multi-core CPU to form robot system. The real-time system Yuqix 17 runs on the processor core 2 and is connected to the real-time device (drive unit 2407) through CAN bus 23. Linux system 13 (including robot operating system ROS) runs on the processor core 1, and, according to the different application requirements of robot control, run ROS real-time nodes of different functions, including location closed-loop control 2408, current control 2410, interpolation calculation 2409, position control 2411, etc., as well as ROS non-real time nodes of various functions, including voice processing unit 2401, image processing unit 2403, voice recognition unit 2402, three-dimensional modeling 2404, object recognition 2405, map building navigation 2406 and so on (application nodes on robot operating system ROS can run on various locations in the system network, so for convenience in the drawing hardware and software modules are placed together in hardware and software module 24.)

Real-time system Yuqix 17 and Linux system 13 are connected to a various cameras or sensors on the robot through respective bus interfaces respectively, where real-time system is connected to the motor controller (drive unit 2407) via CAN bus 23 to ensure the real-time and stability of the motor motion control; the main function to be realized is motion control of robot. Meanwhile, Yuqix 17 of real-time system can drive other peripherals via USB bus 22 or other bus, so as to complete related tasks. Linux 13 of non-real-time system can be connected to external devices via USB bus 22, Ethernet bus 25 and/or etc., to be responsible for sight, sound, man-machine processing, decision-making tasks and other tasks of the entire robot, and the attached peripherals include speech sensor 2412, vision (camera) sensor 2413 and the like.

Figure 3:
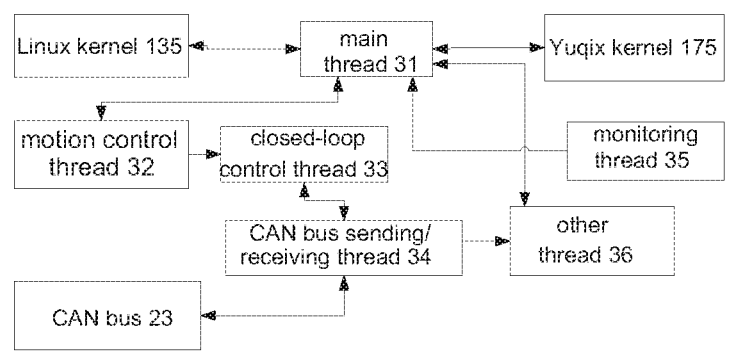
FIG. 3 is flowchart of the motion control section in a typical application example of the present invention.

As shown in the motion control flowchart of FIG. 3, the motion control of the present invention for the robot is carried out by sending control commands for the controller to the interface of CAN bus 23. The motion control in the real-time system Yuqix 17 is mainly functionally differentiated by different threads. The main thread 31 is a real-time ROS node thread which is responsible for establishing a real-time node conforming to the ROS communication protocol, responsible for the initialization of the robot motor and communication between Yuqix kernel 175 and the ROS node running on Linux kernel 135. The main thread 31 is responsible for the communication between the real-time and the non-real-time nodes, and distributes messages to the remaining threads. The CAN bus send/receive thread 34 is for transmitting and reading the data of the CAN bus 23 obtained from the CAN bus device descriptor and is able to distribute the relevant data to other threads 36 in real time.

The motion control thread 32 is mainly responsible for setting the initial position attitude of the robot and at the same time implementing fine interpolation for the motion of the movement unit. After sending the motion control instruction, the closed-loop control thread 33 reads the state of the respective motion joints of the current robot in 1 ms cycles, and the closed-loop control thread 33 corrects the position posture of the current motion unit when the movement unit section does not reach the position required by the control instruction position attitude.

In order to ensure the normal operation of the motion control, the real-time system has monitoring thread 35 responsible for reading the running attitude of the robot when the CAN bus 23 is idle and reading the data information of the sensor on each of the moving units and the task status flag on the control board. For example, when the temperature of the moving unit is too high, the motion should be stopped. When error information is included, the related error handling function needs to be used to deal with the abnormal behavior of the robot according to the different error.

Figure 4:
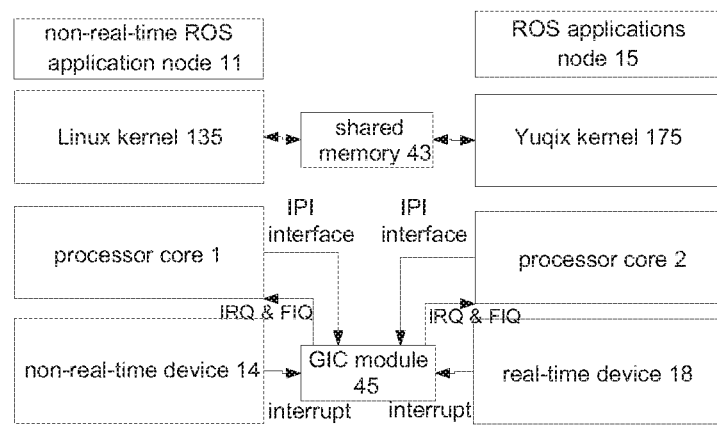
FIG. 4 shows interrupt resource allocation of the present invention based on Cortex-A9 dual-core processor platform.

FIG. 4 shows the basic principle of the support framework RGMP of the robot hybrid system according to the present invention (see: Qiang Yu, Hongxing Wei, Miao Liu, Tianmiao Wang: A novel multi-OS architecture for robot application [R] –2306). Robot hybrid system support framework RGMP uses the characteristics of SMP processor to assign different types of (real-time, non-real-time) external devices into processor cores of different operating systems (real-time system Yuqix 17, non-real-time system Linux 13), respectively, to take over the device interruption of these external devices, and, through establishment of the coordinated communication between the cores, to achieve a reasonable allocation of mixed system processor resources.

In the interrupt resource allocation diagram of one embodiment of the processor platform based on dual-core of FIG. 4, the kernels of the two operating systems, the non-real-time system Linux kernel 135 (supporting the non-real-time ROS application node 11) and the real-time system Yuqix kernel 175 (supporting real-time ROS application node 15) communicate using shared memory 43 and obtains the interruptions of their respective external devices 14 and 18 through the global interrupt routing (GIC) module 45, respectively. The respective operating systems perform independent interrupt responses to their respective control devices. Real-Time System Yuqix kernel 175 is typically connected to real-time device 18 (typically a plurality of independent devices); non-real-time system Linux kernel 135 is connected to non-real-time device 14 (typically a plurality of independent devices); interrupt number(s) for devices 14 and 18 control the global interrupt router module (GIC) 45 by configuring, respectively, to route the fixed interrupt number(s) to the corresponding CPU core (processor core 1 or processor core 2). Since the interrupts of the real-time device 46 are all mapped to the real-time operating system Yuqix for processing, the present method can effectively guarantee the real-time of the response of the interrupt.

In RGMP, the underlying communication between the real-time system Yuqix 17 and the non-real-time system Linux 13 is realized by the shared memory between the processor cores, and the communication process is mapped as the virtual network VNET, to create virtual network devices in the real-time system Yuqix 17 and the non-real-time system Linux 13, to allow unified management by their respective device managers. And the communication between the non-real-time ROS application node 11 and the real-time ROS application node 15 can be performed by directly operating the corresponding virtual network device. In this VNET mechanism, when each communication link is established a dynamic loop queue is created in the memory pool shared by real-time system Yuqix 17 and non-real-time system Linux 13. That is, an operating system allocates a piece of memory from a memory pool, passes it through a circular queue to another operating system, and the another operating system releases it back to the same memory pool after using it. The content of communication between the two operating systems includes data and status.

In the example of the present invention, Yuqix is a common open source operating system (see: http://rgmp-.sourceforge.net/wiki/index.php/Main_Page), which supports C and C++ programming languages and also supports BOOST library and high-precision timers. By using related system resources, a user can perform real-time system cut according to different needs. On Yuqix are integrated mainstream software protocols such as UIP protocol stack, floating-point arithmetic library, and XML-RPC protocol. Users can use these system call functions by their own programming or by calling the standard interface of the robot operating system ROS.

RTroscpp is a development framework that is independent of common operating system platform, and its role is to allow programmers to write the ROS node program that is operating system-independent but is in line with the standard interface and to allow programs developed by users to operate in a plurality of real-time systems. It greatly improves the user's development efficiency and also increases the security of the system code. Programs written by programmer through RTroscpp can be run directly on a standard ROS system.

The Advantages of the Present Invention

The invention fully utilizes the architecture of the multicore processor and the characteristics of the robot system application, and provides a simple and flexible robot application framework. Its advantages include:

it can be used in seamlessly cooperation with the robot operating system ROS and is in full compliance with ROS network node application structure design; the present invention is a good complement to the ROS function;

application resources of robot operating system ROS can be widely used, speeding up the robot's overall design;

the choice of the operating system is not coupled, and the present invention is suitable to a variety of commercially available real-time operating system and non-real-time operating system (need to support ROS);

in the invention, the real-time part of the system is not coupled with the non-real-time part of the system, and the present invention has good modularity substitutability, thereby improving the extensibility of the whole system;

in the present invention, the real-time application design of the robot is standardized, reducing system complexity, thus improving the system maintainability.

The present invention is not limited to the embodiments of the present invention as described above, and any person skilled in the art can understand the conceivable transformations or substitutions within the technical scope disclosed by the present invention, which transformations or substitutions are included within the scope of the present invention. Therefore, the scope of protection of the present invention should be determined by the scope of the claims.

The invention claimed is:

1. A robot hybrid system based on a multi-core processor architecture, comprising:

a robot operating system (12) comprising a non-real-time operating system (13) supporting a robotic operating system that provides basic robotic applications, corresponding services, and system resources;

a real-time operating system (17) that provides services and system resources for robotic real-time tasks; and a hybrid operating system support framework (19) that supports operation and coordination of the robot operating system and the real-time operating system and simultaneously operates the non-real-time operating system (13) and the real-time operating system (17) on a multi-core processor platform, wherein the hybrid operating system support framework includes a non-real-time partial framework (191) and a real-time partial framework (192), the non-real-time operating system (13) being an embedded system running over the non-real-time partial framework (191), wherein:

the real-time operating system (17) runs over the real-time partial framework (192);

the non-real-time operating system (13) runs a plurality of real-time nodes of the robot operating system according to different robot control application requirements, wherein the plurality of real-time nodes of the robot operating system include position closed-loop control unit (2408), current control unit (2410), interpolation solving unit (2409), position control unit (2411), and the non-real-time operating system (13) further runs a plurality of non-real-time nodes of the robot operating system according to functions including speech processing unit (2401), image processing unit (2403), speech recognition unit (2402), three-dimensional modeling unit (2404), object recognition unit (2405), mapping navigation unit (2406); and motion control of a robot in the real-time operating system (17) is functionally differentiated by a plurality of threads, wherein:

a main thread (31) is a real-time robot operating system node thread that establishes a real-time node conforming to a communication protocol of the robot operating system, initializes a robot motor, communicates between the plurality of real time nodes of the robot operating system running on the non-real-time operating system (13) and the real-time operating system (17), communicates between the plurality of real-time nodes and the plurality of non-real-time nodes, and distributes messages to a plurality of other threads;

a CAN bus sending/receiving thread (34) that transmits and reads data on a CAN bus (23), wherein the data is obtained from a CAN bus device descriptor and the CAN bus sending/receiving thread (34) publishes relevant data to the plurality of other threads (36) in real time;

a motion control thread (32) that sets an initial position posture of the robot and simultaneously realizes fine interpolation for movement of a plurality of motion units of the robot;

after sending a motion control instruction to a discrete motion unit of the plurality of motion units, a closed-loop control thread (33) reads a current state of each movement joint of a plurality of movement joints of the robot;

if the movement joint of the plurality of movement joints does not reach a position required by the motion control instruction, the closed-loop control thread (33) retransmits a modified motion control instruction to the movement joint, and the position and attitude of the current motion unit; and the real-time operating system has a monitoring thread (35) that reads an operation posture of the robot when the CAN bus (23) is idle to ensure normal operation of the motion control of the robot and reads sensor data information corresponding to each of the motion units and a task status flag on a control panel.

2. A robot hybrid system according to claim 1, wherein:

the non-real-time operating system (13) and the real-time operating system (17) occupy separate memory spaces respectively, the multi-core processor platform is an open multi-core processor control board, controller and/or industrial computer based on ARM/X86 architecture, and peripherals connected to the multi-core processor platform comprise a non real-time hardware part (14) and a real-time hardware part (18), and the non-real-time operating system (13) is Linux, and the real-time operating system (17) is Yuqix.

3. A robot hybrid system according to claim 1, wherein:

the non-real-time operating system (13) includes system library SYS LIB (131), C language library LIBC (132), network protocol NET (133), BOOST library (134), non-real-time operating system kernel (135), and driver (136) basic to the non-real-time operating system, the real-time operating system (17) is provided with POSIX-compliant system call interface, the real-time operating system (17) comprises system library SYS LIB (171), C language library LIBC (172), network protocol NET (173), BOOST library (174), real-time operating system kernel (175) and driver (176) basic to the real-time operating system, communication between the real-time operating system (17) and the non-real-time operating system (13) is performed through VNET virtual network mechanism of the hybrid operating system support framework (19).

4. A robot hybrid system according to claim 3, wherein:

a non-real-time robot operating system application node (11) that is written by using a standard robot operating system interface and robotic operating system tool, the non-real-time robot operating system application node (11) being on top of the robot operating system (12);

a real-time robotic operating system application node (15) that is written either directly by a user or by RTroscpp software framework (16), the real-time robotic operating system application node (15) being on top of the real-time operating system (17).

5. A robot hybrid system according to claim 3, wherein on top of the real-time operating system (17) is an RTroscpp software framework (16) for writing a robot operating system real-time node program (15) using a standard robot operating system function interface.

6. A robot hybrid system according to claim 3, wherein:
the real-time operating system (17) and the non-real-time operating system (13) respectively occupy different processor cores of the multi-core processor platform for running, and simultaneously maintain respective application states without optimizing with respect to mixed operating system architecture, and running and debugging of the the real-time operating system (17) and the non-real-time operating system (13) is carried out independently, the real-time operating system (17) and the non-real-time operating system (13) independently occupy respective hardware resources when the robot hybrid system is running, and for scheduling of shared devices, the real-time operating system (17) and the non-real-time operating system (13) communicate with each other via the VNET virtual network mechanism of the hybrid operating system support framework (19).

7. A robot hybrid system according to claim 6, wherein:
communication between the real-time operating system (17) and the non-real-time operating system (13) is performed by the VNET virtual network mechanism of the hybrid operating system support framework (19) and using the robot operating system (12) to provide an inter-nodes communication protocol of the robot operating system;

an upper-layer communication interface based on shared memory is provided between the real-time operating system (17) and the non-real-time operating system (13) by the hybrid operating system support framework (19), the upper-layer communication interface including:
    a standard TCP/IP protocol stack between the real-time operating system (17) and the non-real-time operating system (13);
    a real-time system debugging information print pipeline; and
    three user-defined interfaces;

the real-time operating system (17) and the non-real-time operating system (13) respectively use different memory address segments;

external device interruptions between the real-time operating system (17) and the non-real-time operating system (13) are independent and are not shared, and the external device interruptions are independently allocated by an interrupt router provided in said multi-core processor platform;

the real-time operating system (17) and the non-real-time operating system (13) all use standard robot operating system programming and communication interfaces such that application and control programs of the robot hybrid system operate as standard robot operating system nodes and are subjected to unified management of the robot operating system, and communication between the standard robot operating system nodes is carried out through a standard communication interface of the robot operating system;

any node program originally operating on the robot operating system (12) and being independent of any third party function library can be placed directly on the real-time operating system (17) for running; and real-time applications are written on the real-time operating system (17) and are connected to real-time peripherals including motor drivers via a real-time bus to accomplish real-time tasks including complex motor motion control.

8. A robot hybrid system according to claim 3, further comprising;
a global interrupt routing module (45),
wherein the non-real-time operating system kernel (135) supporting a non-real-time application node group (41) and real-time operating system kernel (175) supporting a real-time application node group (42) communicate with each other using shared memory (43) and obtain interruptions of their respective external devices (44, 46) through the global interrupt routing module (45),
wherein interrupt numbers of the external devices (44, 46) are configured to control the global interrupt routing module (45) to route fixed ones of said interrupt numbers to the multi-core processor platform, so as to effectively guarantee that interrupt response is real-time.

* * * * *